United States Patent [19]
Hall

[11] Patent Number: 5,842,395
[45] Date of Patent: Dec. 1, 1998

[54] LATHE FOR PRODUCING AN ASPHERICAL SURFACE ON AN OPTICAL LENS BLANK

[76] Inventor: Larry Gene Hall, 21519 Reindeer Rd., Christmas, Fla. 32709

[21] Appl. No.: 754,211

[22] Filed: Nov. 20, 1996

[51] Int. Cl.$^6$ ....................................................... B23B 7/00
[52] U.S. Cl. .................................... 82/12; 82/19; 82/132; 409/138
[58] Field of Search ................................... 82/12, 19, 17, 82/132; 409/138; 74/567, 569

[56] References Cited

U.S. PATENT DOCUMENTS

| | | | |
|---|---|---|---|
| 1,904,802 | 4/1933 | Schimmel | 82/19 |
| 4,552,045 | 11/1985 | Inoue et al. | 82/19 X |
| 4,584,915 | 4/1986 | Ichiyanagi et al. | 82/19 |
| 4,854,236 | 8/1989 | Thunker et al. | 74/569 X |
| 4,995,300 | 2/1991 | Kaplan et al. | 82/12 |

*Primary Examiner*—Andrea L. Pitts
*Assistant Examiner*—Henry W.H. Tsai
*Attorney, Agent, or Firm*—James H. Beusse; Holland & Knight LLP

[57] ABSTRACT

A lathe for producing an aspherical surface on an optical lens blank has a horizontal base, and a spindle is arranged for disposition in a preselected adjusted position on the base to rotatably mount the optical lens blank about a first preselected axis. A support is arranged on the base for pivotal movement about a second preselected axis. The support includes a roller cam follower rotatable about a third preselected axis and having a cylindric cam follower surface, a cutting tool disposed in a preselected adjusted position on the support for forming the aspherical surface on the optical lens blank, and a fluid pressure motor conjointly urging the roller cam follower and the cutting tool in a direction generally perpendicular to the third preselected axis. A roller cam disposed in a preselected adjusted position is rotatable about a fourth preselected axis, and a cylindric cam surface on the roller cam is associated in a rolling point of contact with the cylindric cam follower surface on the roller cam follower. All the preselected axes are coplanar, and the second, third and fourth preselected axes are disposed in respective plans having a predetermined angular relationship with the first preselected axis at least when the spindle, the cutting tool, and the roller cam are in the respective preselected adjusted positions thereof.

4 Claims, 3 Drawing Sheets

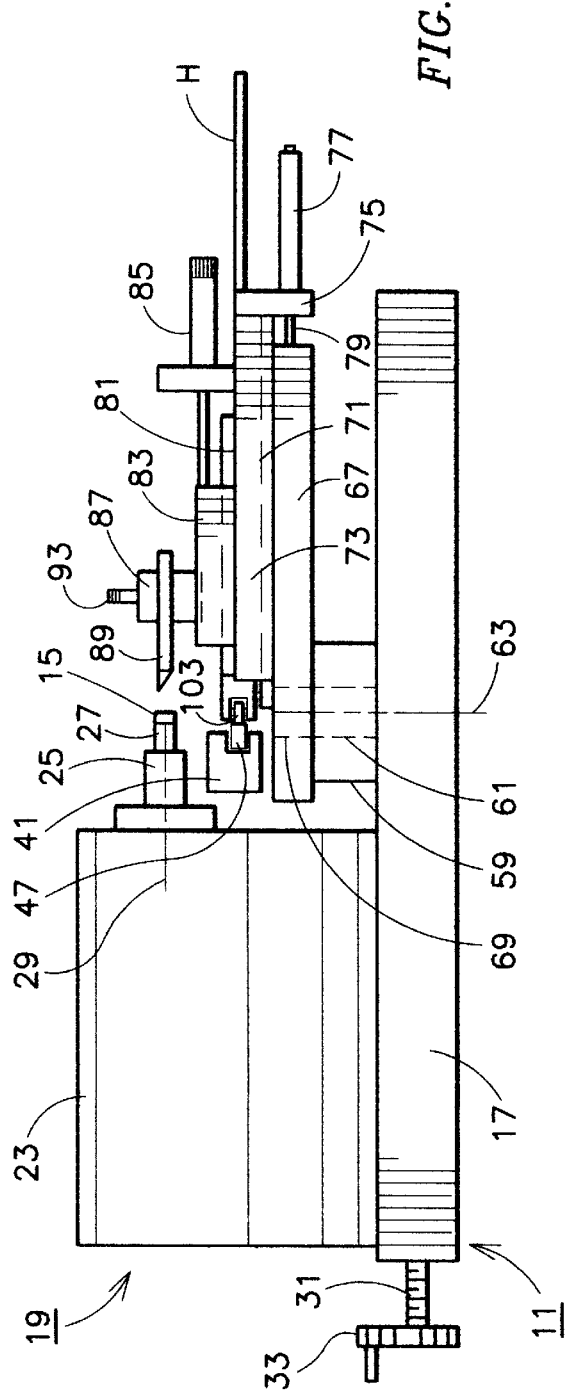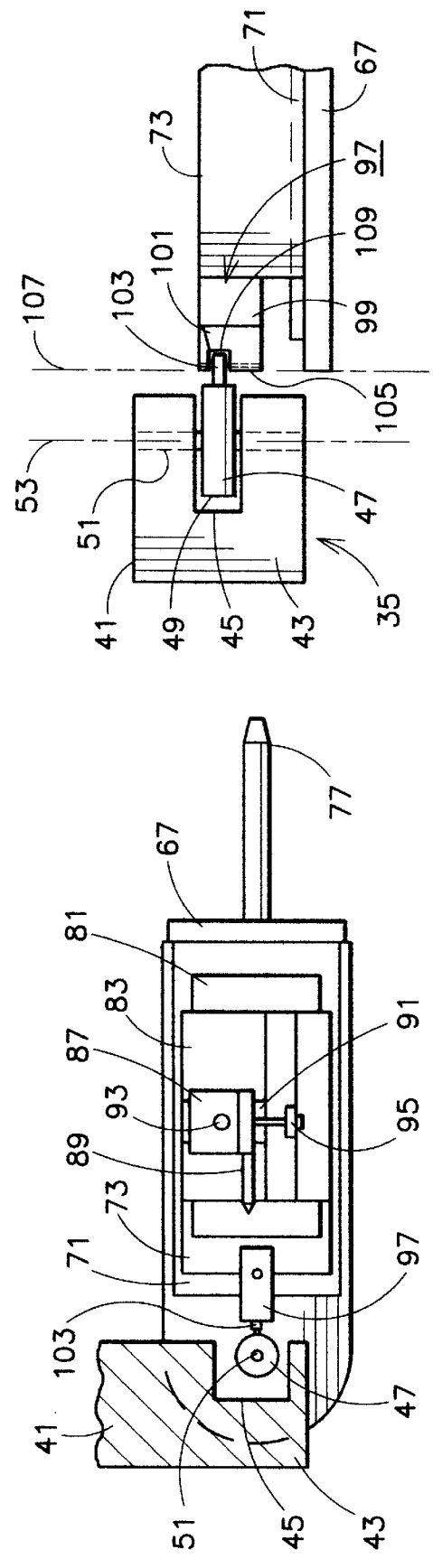

LATHE FOR PRODUCING AN ASPHERICAL SURFACE ON AN OPTICAL LENS BLANK

FIELD OF THE INVENTION

This invention relates in general to lathes and in particular to those operable for producing an aspherical surface on an optical lens blank.

BACKGROUND OF THE INVENTION

In the past, various different types of lathes have been utilized for producing aspherical surfaces on optical lens blanks, and one of such past lathes is disclosed in U.S. Pat. No. 4,995,330 issued Feb. 26, 1991. The aforementioned patented lathe employs a cam follower having a generally V-shaped configuration which is caused to bear against a roller cam and move with respect to the roller cam in a manner to result in the guiding of a cutting tool for forming an aspherical surface on the optical lens blank which is rotated relative to the cutting tool. While the aforementioned patented lathe may have many salient features, it is believed that the engagement of the generally V-shaped cam follower with the roller cam may have effected undesirable constantly changing pressures and frictions on the cutting tool which may have resulted in undesirable irregular cutting movement thereof on the surface of the optical lens blank.

SUMMARY OF THE INVENTION

In one form of the invention, a lathe for producing an aspherical surface on an optical lens blank is provided with a generally horizontal base, and spindle means is arranged for disposition in a preselected adjusted position on the base to rotatably mount the optical lens blank about a first preselected axis. Supporting means is arranged on said base for pivotal movement with respect thereto about a second preselected axis. The supporting means includes a roller cam follower means for rotation about a third preselected axis and having a cylindric cam follower surface, a cutting tool means arranged for disposition in a preselected adjusted position on the support and operable generally for forming the aspherical surface on the optical lens blank, and means operable generally for conjointly urging the roller cam follower means and the cutting tool means on said supporting means in a direction generally perpendicular to the third preselected axis. Roller cam means disposed in a preselected adjusted position is operable generally for rotation about a fourth preselected axis, and a cylindric cam surface on the roller cam means is associated in a rolling point of contact with the cylindric cam follower surface on the roller cam follower means. All of the preselected axes are coplanar, and the second, third and fourth preselected axes are disposed in respective planes having a predetermined angular relationship with the first preselected axis at least when the spindle means, cutting tool means and roller cam means are in the respective preselected adjusted positions thereof.

BRIEF DESCRIPTION OF THE DRAWINGS

FIG. 1 is a side elevational view of a lathe in one form of the invention for producing an aspherical surface on an optical lens blank;

FIG. 3 is a fragmentary plan view illustrating in part the association of a pivotal assembly and a displacement arm assembly of the lathe of FIG. 1;

FIG. 4 is an enlarged fragmentary view taken from FIG. 1;

Corresponding reference characters indicate corresponding parts throughout the several views of the drawings.

The exemplifications set out herein illustrate the preferred embodiment of the invention in one form thereof, and such exemplifications are not to be construed as limiting the scope of the invention or the scope of the disclosure thereof in any manner.

DETAILED DESCRIPTION OF THE PREFERRED EMBODIMENT

Figure 2:
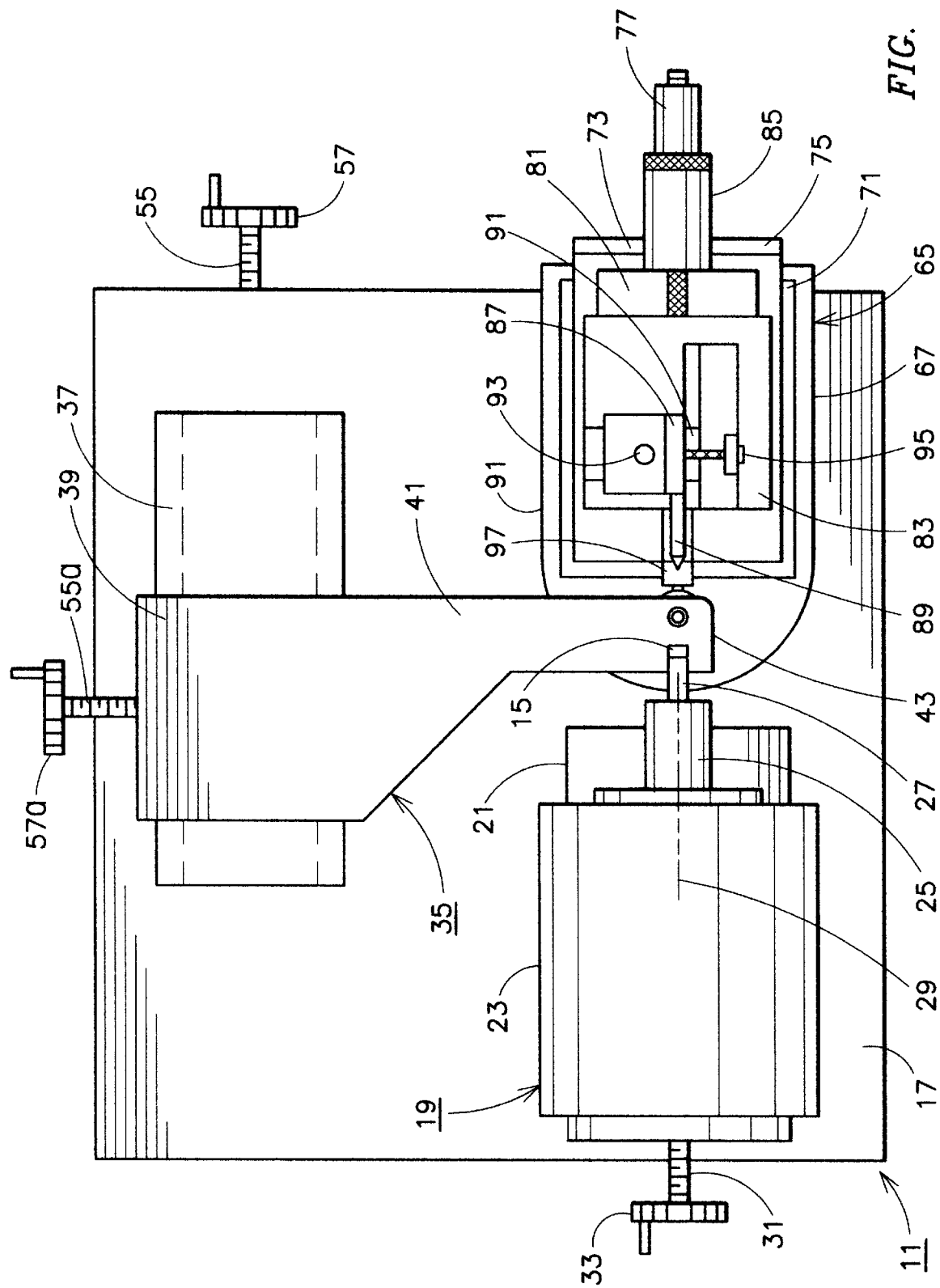
FIG. 2 is a top elevational view of the lathe of FIG. 1.
Figure 7:
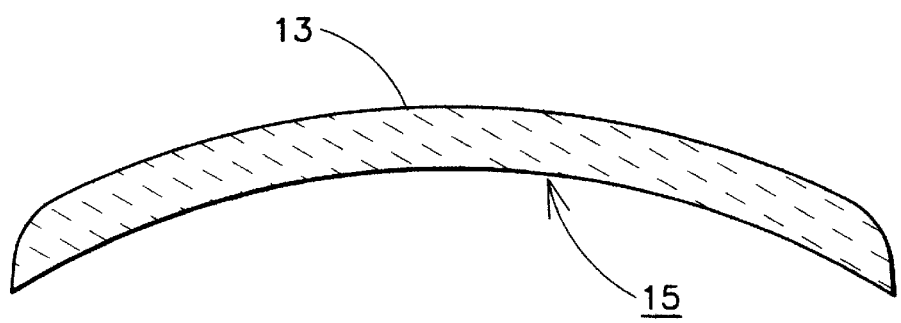
FIG. 7 is a sectional view of an optical lens blank having an aspherical surface produced by the lathe of FIG. 1.

Referring now to FIGS. 1, 2 and 7, a lathe 11 shown in one form of the invention is operable generally for producing an aspherical surface 13 on an optical lens blank 15, such as for instance, a contact lens blank or the like, as discussed in greater detail hereinafter.

Lathe 11 is provided with a generally horizontally extending base or base plate 17, as shown in FIGS. 1 and 2, and a headstock 19 is generally horizontally movable or guided on the base plate. The horizontal movement of headstock 19 is guided or predetermined by a dovetail guide or plate 21 in cooperating dovetailing or guiding relationship with a casing 23 of the headstock in a manner well known to the art. A spindle or spindle means 25, is carried by headstock casing 23 and includes a chuck 27 for positioning or mounting contact lens blank 15 thereon. Spindle 25 is arranged in headstock casing 23 for rotational movement about a preselected or generally horizontal axis 29, and the spindle is rotatably driven at a preselected speed through an electric motor and gear box combination (not shown) well known in the art which is continued within casing 23 of headstock 19. Headstock 19 is predeterminately horizontally movable on base 17 along the aforementioned cooperating dovetail guide 21 by a lead screw mechanism 31 drivingly or adjustably associated with headstock casing 23, and an operator operated wheel 33 is manually rotatable to adjustably control the driving association of lead screw mechanism 31 with headstock casing 23 to adjustably predetermine the desired location or preselected adjusted position of spindle 25 along its preselected axis 29.

A displacement arm assembly 35 is also generally horizontally movable or guided on base 17, and the horizontal movement of displacement arm assembly 35 is guided or predetermined by a dovetail guide or plate 37 provided on base 17 in cooperating dovetailing or guiding relationship with a casing 39 of the displacement arm assembly in a manner well known to the art. A generally elongate support or arm 41 integral with casing 39 of displacement arm assembly 35 extends generally laterally therefrom, and a free end or end portion 43 of the elongate arm is disposed generally vertically between base 17 and chuck 27 of spindle 25. As best seen in FIG. 4, free end 43 of elongate arm 41 is slotted at 45, and a roller cam or cam means 47 having a generally cylindric cam surface 49 is disposed in part within slot 45, and the roller cam is rotatably mounted on a cam shaft 51 carried in free end 43 of elongate arm 41 with the cam shaft and the roller cam being rotatable about a preselected axis 53. Displacement arm assembly 35 is predeterminately horizontally movable on base 17 along the aforementioned cooperating dovetail plate 37 and casing 39 by a lead screw mechanism 55 drivingly or adjustably associated with casing 39, as seen in FIG. 2, and an operator operated wheel 57 is manually rotatable to adjustably control the driving association of lead screw mechanism 55 with casing 39 of displacement arm assembly 35. Additionally, casing 39 of displacement arm assembly 35 is also arranged in dovetail or guiding relation with dovetail plate 37 so as to be predeterminately laterally movable with respect to both the aforementioned cooperating dovetail plate 37 and base 17 by another lead screw mechanism 55*a* drivingly or adjustably associated with casing 39, as seen in FIG. 2, and another operator operated wheel 57*a* is manually rotatable to adjustably control the driving association of lead screw mechanism 55 casing of displacement arm assembly 35. In this manner, the above mentioned operator operation of wheels 57, 57*a* of lead screw mechanisms 55, 55*a*, respectively, are effective to adjustably predetermine the desired location or preselected adjusted position of roller cam 47, as discussed hereinafter.

With reference now to FIGS. 1–3, a quadrant bearing 59 is fixedly secured to base 17 by suitable means (not shown) in a manner well known to the art, and a bearing shaft 61 is rotatably or pivotally supported in the quadrant bearing extending in part exteriorly and vertically upwardly therefrom about a preselected axis 65.

A pivotal assembly 65 is shown in its centered or at-rest position, and the pivotal assembly may be angularly or pivotally displaced from its at-rest position in response to a manual force (not shown) selectively exerted on a handle H attached to a generally elongate plate 67 of the pivotal assembly, as discussed hereinafter. Elongate plate 67 is conjointly rotatable or pivotally movable with bearing shaft 61 of quadrant bearing 59, and elongate plate 67 is secured to the bearing shaft adjacent its upper or free end 69. As so mounted to bearing shaft 61, elongate plate 67 extends generally in parallel spaced apart relation with base 17, and the elongate plate defines a supporting means operable generally for pivotal movement with respect to the base about preselected axis 63, as discussed in greater detail hereinafter.

Pivotal assembly 65 includes a guide means, such as a guide rail or plate 71 fixedly secured in a predetermined position on elongate plate 67 by suitable means (not shown) in a manner well known to the art, and a guided means, such as a slide or slide plate 73 or the like for instance, is arranged in dovetail relation with the guide rail so as to be slidably and guidably retained thereon. When so arranged with guide rail 71, slide 73 is predeterminately movable horizontally or axially along elongate plate 67, as seen in FIGS. 1 and 3, while also being conjointly angularly displaceable with the elongate plate about preselected axis 63 of quadrant bearing shaft 61. A depending flange 75 is secured to the rightward end of slide 73, as seen in FIGS. 1 and 3, by suitable means (not shown) in a manner well known to the art, and a conjointly urging means, such as a fluid pressure motor or vacuum actuated cylinder 77 or the like for instance, is carried on the depending flange with the fluid pressure motor having a push rod 79 extending therefrom into abutting engagement with elongate plate 67. When fluid pressure motor 77 is pressurized, it may be noted that the fluid pressure motor defines a means operable for exerting a constant force on slide 73, as further discussed hereinafter.

Another guide means, such as a guide rail or plate 81 or the like for instance, is fixedly secured in a predetermined position on slide 73 by suitable means (not shown) in a manner well known to the art, and a cutting tool carriage or slide 83 is arranged in dovetail relation with guide rail 81 so as to be slidably and guidably retained on slide 73. When so arranged with slide 73, cutting tool carriage 83 is predeterminately movably horizontally along slide 73, as seen in FIGS. 1 and 3. Furthermore, an adjusting mechanism 85 mounted on slide 73 is arranged in threaded adjusting engagement with carriage 83, and the adjusting mechanism is manually operable to adjustably move or drive carriage 83 horizontally on slide 73 and along guide rail 81 thereon into a preselected adjusted position with respect to slide 73.

Carriage 83 includes a cutting tool post or mount 87 in which a cutting tool or cutting tool means 89 is carried, and post 87 is arranged in dovetail relation with a cooperative dovetail slot or guideway 91 provided in carriage 83 so as to be guidably retained thereon and slidable relative to the carriage in a direction generally perpendicular to the above discussed horizontal movement of the carriage on slide 73. Post 87 is provided with manually operable adjusting device 93 for adjusting the height of cutting tool 87, i.e. adjusting the cutting tool vertically as seen in FIG. 1, and another adjusting device 95 mounted on carriage 83 is arranged in threaded adjusting engagement with post 87. Adjusting devices 93, 95 are well known to the art, and such adjusting devices are manually operable to adjustably move or drive post 87 into a preselected adjusted position with respect to carriage 83. Thus, in view of the foregoing, it may be noted that the manual adjusting operations of adjusting devices 85, 93, 95 are effective to dispose cutting tool 89 in a preselected adjusted position in axial alignment with preselected axis 29 of spindle 25 on headstock 19 of lathe 11.

A cam follower assembly 97 is provided with a support or housing 99 which is releasably secured in a preselected position to slide 73 by suitable means (not shown) in a manner well known to the art, and housing 99 is slotted at 101 to receive in part a roller cam follower or roller cam follower means 103, as seen in FIGS. 3 and 4. Roller cam follower 103 is rotatably arranged on a cam shaft 105 supported in housing 99 of cam follower assembly 97 so as to be rotatable about a preselected axis 107, and roller cam follower 103 has a cylindric cam follower surface 109 which is associated in a rolling point of contact with cylindric cam surface 49 on roller cam 47.

In the light of the foregoing, it may be noted that at least when spindle 25, roller cam 47 and cutting tool 89 are in their respective preselected adjusted positions, all of the preselected axes 29, 53, 63, 107 are coplanar, and the preselected axes 53, 63, 107 are disposed in respective planes, each having a predetermined angular relationship, i.e., generally perpendicular, with preselected axis 29.

Of course, each contact lens blank 15 is formed with a desired aspherical surface configuration or curvature 13, as seen in FIG. 7, in accordance with a medical prescription written to correct a particular sight problem. In order to meet the particular requirements of one such aforementioned medical prescription, headstock 19 and displacement arm assembly 35 are respectively predeterminately adjustably movable horizontally with respect to base 17 into preselected adjusted positions thereby to predeterminately locate contact lens blank 15 disposed on spindle 25 of headstock 19 and to predeterminately locate preselected axis 53 of roller cam 47 in adjustable horizontally spaced apart relation from preselected axes 63 of bearing shaft 63 in quadrant bearing 59. The above discussed adjustable movements of headstock 19 and displacement arm assembly 35 may be effected by the manual operation of lead screw mechanism 31 and wheel 33 of the headstock and by lead screw mechanisms 55, 55*a* and wheels 57, 57*a* of the displacement arm assembly, respectively.

Figure 5:
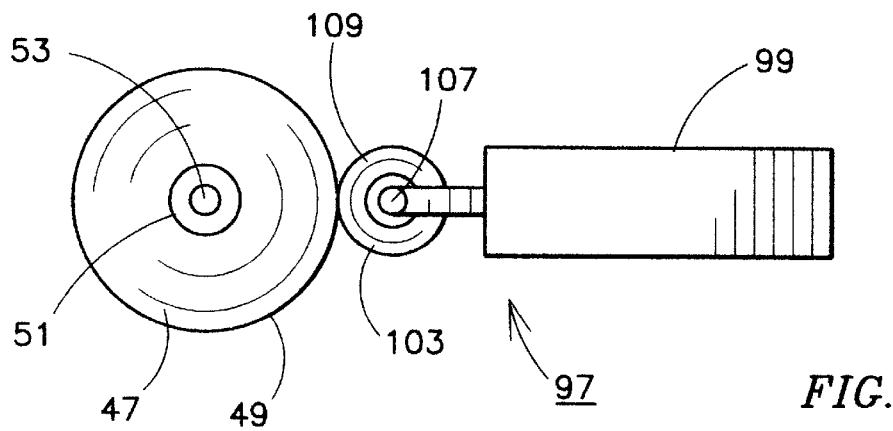
FIGS. 5 and 6 are diagrammatic views illustrating a rolling point of contact maintained between a roller cam and a roller cam follower utilized in the lathe of FIG. 1.
Figure 6:
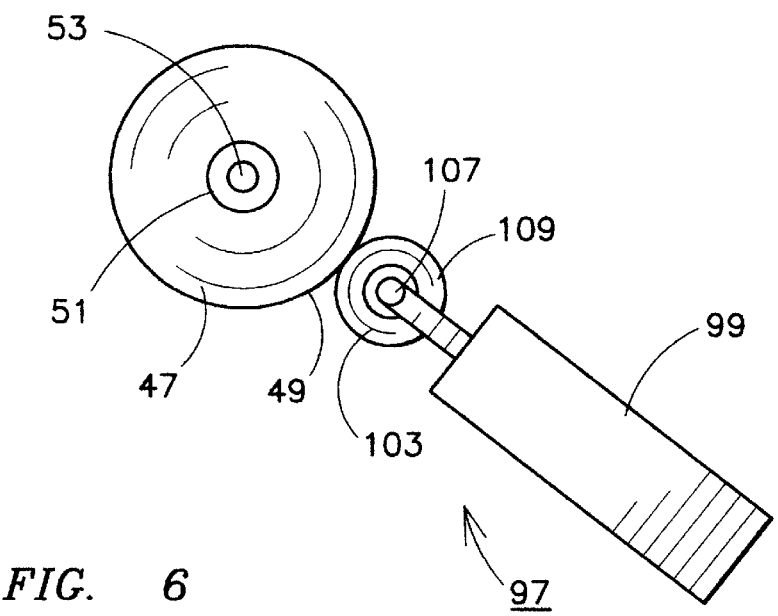

Upon the disposition of preselected axes 53, 63 in their adjustable horizontally spaced apart relation, as discussed above, roller cam follower 103 is adjustably moved or urged into a preselected adjusted position to predeterminately locate its cylindric cam follower surface 109 in a rolling line of contact with cylindric cam surface 49 on roller cam 47 of displacement arm assembly 35, as best seen in FIGS. 5 and 6. As previously discussed, cam follower assembly 97 is carried on slide 73 of pivotal arm assembly 65 so that the pressurization of fluid pressure motor 77 is effective to provide a constant force for conjointly urging slide 73 and cam follower assembly 97 on guide rail 71 of pivotal arm assembly 65 in a direction to effect the rolling line of contact of cylindric cam follower surface 109 on roller cam follower 103 with cylindric cam surface 49 on roller cam 47 of displacement arm assembly 35. Thus, upon the biasing of roller cam follower 103 in the rolling line of contact with roller cam 47 along with the above discussed disposition of preselected axis 53 of roller cam 47 in adjustable horizontal spaced apart relation from preselected axis 63 of quadrant bearing shaft 63, lathe 11 is enabled to be operable for forming the desired aspherical surface configuration or curvature 13 on contact lens blank 15, as seen in FIG. 7, in order to meet the requirements of the aforementioned medical prescription therefor.

Adjusting devices 85, 93, 95 associated with cutting tool carriage 83 may be manually operated in order to dispose cutting tool 89 in its preselected adjusted position and in alignment with preselected axis 29 of spindle 25 on headstock 19, as previously discussed, and when so disposed, the cutting tool is located at least adjacent the center point of contact lens blank 15 chucked on spindle 25.

When the components of lathe 11 are adjustably positioned in the manner discussed hereinabove, a manual force may be exerted on handle H of pivotal assembly 65 to effect its angular displacement or pivotal movement between the centered position of pivotal assembly 65, as illustrated in FIG. 5, and the pivotally displaced position thereof, as illustrated in FIG. 6, and the pivotal movement of pivotal assembly 65 is, of course, about preselected axis 63 of quadrant bearing shaft 61 and generally parallel to base 17. The aforementioned manual pivotal movement of pivotal arm assembly 65 effects the cutting engagement of cutting tool 89 with contact lens blank 15 conjointly rotated with spindle 25 of headstock 19, and such manual pivotal movement of pivotal arm assembly 65 may be continued until the desired aspherical surface 13 is cut into or formed in contact lens blank 15 by cutting tool 89.

As previously noted, fluid pressure motor 77 is operable to exert a constant force on slide 73 thereby to urge cylindric cam surface 109 on roller cam follower 103 into the rolling point of contact with cylindric cam surface 49 on roller cam 47 and to conjointly urge cutting tool 89 toward cutting engagement with contact lens blank 15 rotatably carried on spindle 25. Thus, it is believed that the constant force exerted by fluid pressure motor along with the rolling point of contact between roller cam 47 and roller cam follower 103 results in a more regular and smoother cutting movement of cutting tool 89 on the surface of contact lens blank 15.

Of course, it is understood that the aforementioned rolling point of contact between roller cam 47 and roller cam follower 103 comprises a line of engagement or contact formed between cylindric cam surfaces 49, 109 on the roller cam and roller cam follower, respectively. Furthermore, it is contemplated that various different types of radial or movement setting gauges may be associated with at least headstock 19, displacement arm assembly 35 and pivotal arm assembly in a manner well known to the art; however, such gauges are omitted for the purpose of brevity of discussion and drawing simplification.

What is claimed is:

1. A lathe for producing an aspherical surface on an optical lens blank comprising:

a generally horizontal base;

spindle means arranged for disposing in a preselected adjusted position on said base to rotatably mount the optical lens blank about a first preselected axis;

supporting means arranged on said base for pivotal movement with respect thereto about a second preselected axis, said supporting means including a roller cam follower means for rotation about a third preselected axis and having a cylindric cam follower surface, cutting tool means arranged for disposition in a preselected adjusted position on said supporting means and operably generally for forming the aspherical surface on the optical lens blank, and means operable generally for conjointly urging said roller cam follower means and said cutting tool means on said supporting means in a direction generally perpendicular to said third preselected axis; and roller cam means arranged for disposition in a preselected adjusted position and operable generally for rotation about a fourth preselected axis, and a cylindric cam surface on said roller cam means associated in a rolling point of contact with said cylindric cam follower surface on said cam follower means.

2. The lathe as set forth in claim 1 wherein said supporting means further includes guided means movable on said supporting means for mounting said roller cam follower means and said cutting tool means, said conjointly urging means being associated with said guided means.

3. The lathe as set forth in claim 2 wherein said conjointly urging means comprise means operable for exerting a constant force on said guided means.

4. The lathe as set forth in claim 1 wherein said conjointly urging means comprises a fluid pressure motor.

\* \* \* \* \*